May 21, 1963 E. E. HOOD ET AL 3,090,247

VARIABLE SPEED TRANSMISSION

Filed Sept. 12, 1960 2 Sheets-Sheet 1

WITNESS:
Esther M. Stockton

INVENTORS
Edwin Elliott Hood
Charles A. Mendenhall
BY John Phillip Ryan
ATTORNEY 3,090,247
VARIABLE SPEED TRANSMISSION
Edwin Elliott Hood, Elmira, and Charles A. Mendenhall, Horseheads, N.Y., assignors to The Bendix Corporation, Elmira Heights, N.Y., a corporation of Delaware
Filed Sept. 12, 1960, Ser. No. 55,548
8 Claims. (Cl. 74—359)

The present invention relates to a variable speed transmission for washing machines and the like and more particularly to a transmission of this type which is adapted for automatic control, incorporating means within at least one of the gear trains for cushioning the shock attendant upon change of gear ratio.

It is an object of the present invention to provide a novel variable speed transmission which is efficient and reliable in operation, durable, as well as simple and economical in construction.

It is another object of the present invention to provide a transmission having resilient shock absorbing means incorporated within at least one of the gear trains to resiliently yield under momentary overloads incident to the shift from one gear ratio to another.

It is another object of the present invention to provide a transmission having a hub assembly journalled on one of the shafts rotatably supporting a ring gear assembly and having resilient spring means operably engaging and positioned between the hub and ring gear adapted to resiliently yield and lessen or absorb momentary shock loadings incident to a change of gear ratio.

Further objects and advantages will be apparent from the following description taken in connection with the accompanying drawing in which.

Figure 1:
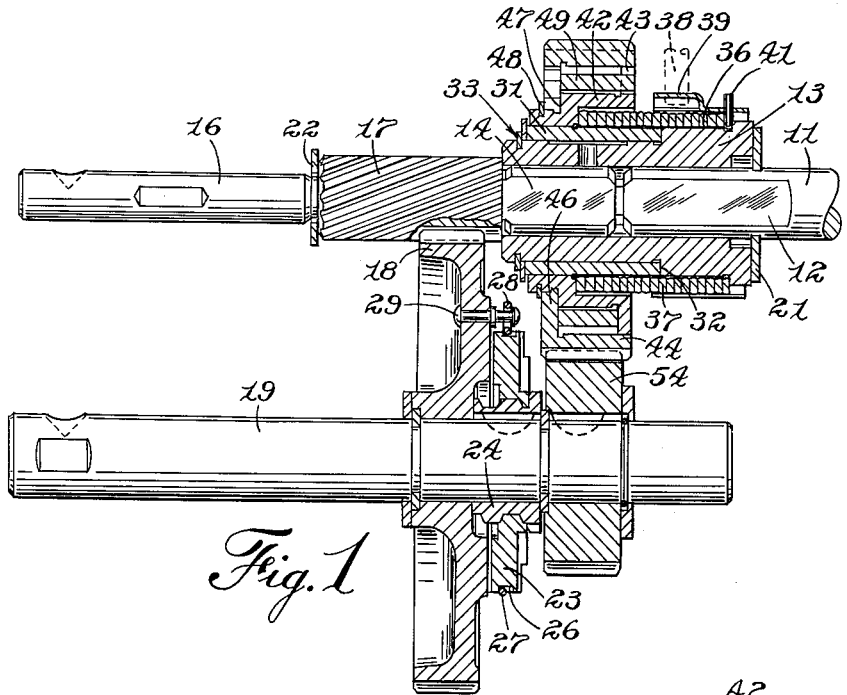
FIGURE 1 is a side elevation, partly broken away and in section, of a preferred embodiment of the invention.
Figure 2:
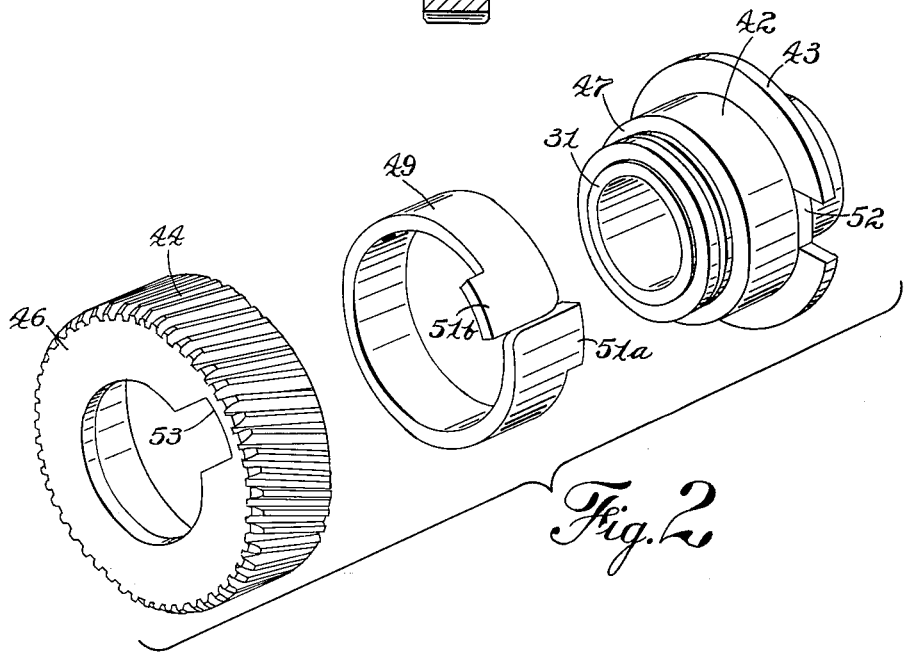
FIGURE 2 is an exploded perspective detail view of the hub assembly, the resilient spring member and the ring gear assembly which elements combine to provide the shock absorbing features of the invention.

In FIGURE 1 of the drawing there is illustrated a power shaft 11 which is provided for a portion of its length with a "double-D" section 12 on which a coupling sleeve member 13 is mounted. The coupling sleeve member 13 is provided throughout its bore length with a hollow "double-D" section conforming with and slidably receiving the correspondingly formed and aligned "double-D" section 14 of the driving shaft 16 and the "double-D" section 12 of the power shaft 11.

Mounted on or formed as an integral part of the driving shaft 16 is a driving pinion 17 which is adapted to mesh with a driven gear 18 journalled on a driven shaft 19 located parallel to the driving shaft 16. This described gear train constitutes the low speed driving mechanisms.

The coupling sleeve 13 is retained in alignment and properly positioned by abutting an extremity of the low speed driving pinion 17 and by a snap ring 21 engaging the power shaft 11. Since, in the illustration, pinion 17 is a separately formed element, it is retained on the driving shaft 16 against axial displacement by a snap ring 22.

The operated elements of the vehicle utilizing this transmission (not shown) are generally mounted on the left-hand extremities of the driving and driven shafts, 16 and 19, respectively.

An overrunning clutch connection from the driven gear 18 to the driven shaft 19 is provided comprising a clutch nut 23 threaded on a screw shaft 24 fixedly mounted on the driven shaft, the inclination or hand of the threads of the screw shaft being such that the adjacent surfaces of the driven gear 18 and the clutch nut 23 are brought into clamping engagement by the screw jack action of the screw shaft and nut when driving torque is transmitted through the clutch nut. In order to initiate such driving engagement the clutch nut is provided with a peripheral groove 26 in which a split spring ring 27 is frictionally mounted, said ring having a loop 28 at the leading end. A pin 29 fixedly mounted in the driven gear 18 is arranged to engage the loop of the spring and cause the spring to draw the clutch nut into clamping engagement with the driven gear.

A sleeve bearing 31 is rotatably mounted on one extremity of the coupling sleeve member 13 and is held against axial displacement by a shoulder 32 formed on the coupling sleeve member and by a snap ring and washer arrangement generally designated as 33 journalled in and on the coupling sleeve member. The coupling sleeve member is formed with a cylindrical enlargement or drum 36 having the same external diameter as the sleeve bearing 31. A spring clutch element 37 is arranged to form the driving connection between the coupling sleeve member's drum surface 36 and the external surface of the sleeve bearing 31 when permitted to do so by the withdrawal of a pin 38 from engagement with a sleeve 39 connected with a driving end 41 of the clutch spring. To effect the withdrawal of the pin a solenoid (not shown) may be utilized.

A collar 42 fixedly secured to one end of the bearing sleeve 31 is formed so as to provide a cavity which encompasses the extremity of the spring 37 which in turn engages the external surface of the sleeve bearing. The collar is further formed with a radially outwardly extending flange 43. A ring gear 44 is rotatably supported on the periphery of the flange 43 and has a second flange 46 formed as an integral part thereof or as a separate element secured thereto in any convenient manner. The flange 46 is rotatably supported on the collar extremity opposite the flange 43 and is prevented from being axially displaced by slidably abutting a shoulder 47 formed on the collar 42 and a lock ring 48 fixed to the collar. In a generic sense the combination of the sleeve bearing 31 and the collar 42 is classified as a hub assembly and any references to or designation using that term are broadly intended in that sense. Also, references to the ring gear assembly are intended to include its flange as well.

Means are provided to operably couple the hub assembly and the ring gear assembly. These means comprise a yieldable spring 49, interchangeably defined as a spiral, flat-coiled, clock, power or motor spring, positioned between the flanges 43 and 46 concentrically and spatially disposed about the portion of the collar intermediate the flanges. Lug members 51a and 51b are provided on the extremities of the spring member and are so disposed as to engage radial notch means 52 and 53 formed in the flanges of the collar and the ring gear, respectively. The ring gear 44 which provides the driving gear in the instant illustration is arranged to mesh with the driven pinion 54 fixed on the driven shaft 19. The gear train comprising the ring gear 44 and driven pinion 54 constitutes the high speed driving mechanism.

In operation, rotation of the power shaft 11 is transmitted through the coupling sleeve member 13 to rotate the driving shaft 16. The clutch spring 37 is held out of engagement by the control pin 38. The low speed driven gear 18, as rotated by the driving pinion 17, transmits torque through the overrunning clutch 23, 24 to the driven shaft 19 which, consequently, rotates the operated elements at a low speed. When it is desired to operate the elements at a high speed, the solenoid (not shown) is energized to effect the withdrawal of the pin 38 permitting the clutch spring 37 to connect the high speed ring gear 44 to the driving shaft 16 which, consequently, rotates the high speed driven pinion 54. The overrunning clutch 23, 24 is automatically disengaged due to the acceleration of the driven shaft 19.

Although the engagement of the clutch spring 37 is frictional in character, it takes place quickly and positively due to its wrap-down or prehensile action. Since the rotating parts of the motor (not shown) and transmission and of the elements to be operated by the driven shaft 19 have considerable inertia, this sudden change in driving gear ratio places a heavy momentary loading on the transmission which substantially exceeds the normal driving torque. This momentary excessive torque requirement causes the spring member 49 to radially expand or unwind thereby momentarily absorbing a portion of the load placed on the transmission and limiting the torque transmitted through the gear train. The momentary absorption of the excessive driving torque provides a sufficient time interval for the acceleration of the driven shaft and operated elements after which the parts may rotate in unison and the spring may resiliently assert itself and return to its normal position.

Figure 3:
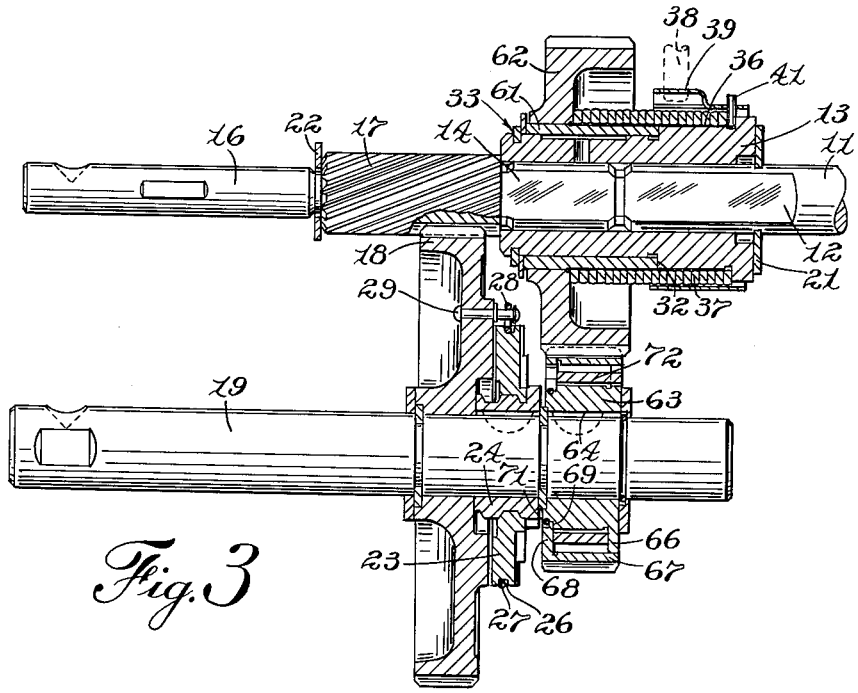
FIGURE 3 is a view similar to FIGURE 1, illustrating a second embodiment of the present invention.

It will be understood that various changes may be made in the precise form and arrangement of the parts. One example of a variation would be the use of a resilient spring which is generally designated as a spiral spring incorporating more than one turn or coil. This spiral spring's expansive or contractive characteristics can be utilized to accomplish the shock absorbing function. Another example of a variation would be to incorporate the shock absorbing structures in the driven gear members rather than the driving gear members. In FIGURE 3 there is illustrated a second embodiment of the present invention wherein the shock absorbing structures are incorporated in the driven gear member. In this embodiment like reference characters indicate like elements. A sleeve bearing 61 is rotatably mounted on one extremity of the coupling sleeve 13 and is held in axial alignment by the shoulder 32 and the snap ring-washer arrangement 33. A high speed gear 62 is affixed to one extremity of the sleeve bearing 61 with the opposite extremity of the sleeve providing a cylindrical hub upon which the spring clutch element 37 exerts its prehensile grasp when the clutch means is actuated.

A collar or hub assembly 63 is secured to the driven shaft 19 by a key 64. A radially outwardly extending flange 66 is formed on one extremity of the collar 63 and a pinion gear 67 is rotatably supported on the periphery of the flange 66. The pinion gear 67 has a flange 68 rotatably supported on the collar extremity opposite the flange 66. A shoulder 69 and a snap ring 71 maintain the pinion gear in proper axial alignment on the collar and in mesh with the high speed driving gear 62.

Means are provided to operably couple the hub assembly 63 to the pinion gear 67. The means comprise a spring 72 positioned between the flanges 66 and 68 concentrically and spatially disposed about the collar 63. Lugs similar to those previously described as 51a and 51b are formed one on each end of the spring extremities to engage radial notches formed in the flanges which are similar to the previously described notches 52 and 53. Operation of the shock absorbing structure is substantially identical to that previously described for the preferred embodiment.

While the disclosures illustrate the inventive feature incorporated in the structure of a high speed gear train, it should be understood that it is equally applicable to low or intermediate gear trains as well. These various changes may be accomplished without departing from the spirit of the invention.

We claim:
1. In a transmission:
   a power shaft;
   a driving shaft;
   a coupling member for said shafts;
   a driven shaft;
   a plurality of gear trains for connecting the driving and driven shafts at different gear ratios, at least one of said gear trains including a driven gear supported on the driven shaft and a driving gear supported on the coupling member adapted to mesh with the driven gear;
   means for selectively rendering the gear trains operative;
   means for coupling one of the gears of said one gear train to its respective support including a collar member fixedly secured to said respective support and having a flange at one extremity thereof rotatably supporting said one gear, said one gear having a flange rotatably supported on the other extremity of the collar, a flat-coil spring concentrically and spatially disposed about the collar having a splined connection at one extremity with the collar flange and having a splined connection at its other extremity with the flange of said one gear; and,
   means for non-rotatably securing the other of said gears to its respective support.

2. A transmission as set forth in claim 1 in which the means for selectively rendering the gear trains operative comprises:
   a self tightening clutch connection for each gear train; and,
   separately operable means for initiating clutch operation.

3. In a transmission:
   a power shaft;
   a driving shaft in alignment with the power shaft;
   a coupling member for the power and driving shafts;
   a driven shaft parallel to the driving shaft;
   a first gear train for connecting the driving and driven shafts;
   a second gear train having a different gear ratio than said first gear train for connecting the driving and driven shafts, said second gear train including:
      a sleeve journalled on one of the shafts connected by said second gear train and having an outwardly extending flange formed thereon;
      a ring gear journalled on the sleeve flange and having an inwardly extending flange rotatably supported on the sleeve and axially separated from the sleeve flange;
      a resilient flat-coiled spring positioned between and engaging said flanges to operably couple the sleeve and ring gear; and,
      a pinion gear non-rotatably connected to the other of said shafts connected by said second gear train adapted to mesh with the ring gear; and,
   means for selectively rendering said gear trains operative.

4. A transmission as set forth in claim 3 in which the means for selectively rendering the gear trains operative comprises:
   a self tightening clutch connection for each gear train; and,
   separately operable means for initiating clutch operation.

5. In a transmission:
   a power shaft;
   a driving shaft;
   a coupling member connecting said shafts;
   a driven shaft parallel to the driving shaft;
   a low speed driving pinion non-rotatably connected to the driving shaft;
   a low speed driven gear journalled on the driven shaft adapted to mesh with the low speed pinion;
   clutch means for connecting the low speed driven gear to the driven shaft;
   a high speed driven pinion non-rotatably secured to the driven shaft;
   a high speed driving gear, including means for absorbing loads on the transmission which momentarily exceed the normal torque capacities, journalled on the coupling member and adapted to mesh with the high speed driven pinion;

clutch means for connecting the high speed driving gear to the coupling member;

separately operable means for initiating the operation of the clutches;

said load absorbing means being characterized by:
- a sleeve journalled on the coupling member and operably engageable by the high speed clutch means;
- a collar member secured to one extremity of the sleeve and having a radial flange positioned adjacent the other extremity of the sleeve;
- radial flange means on the high speed gear journalled on the collar and positioned adjacent said one extremity of the sleeve; and,
- resilient flat-coiled spring concentrically disposed about the sleeve and having lug members on its extremities, said lug members extending in opposite directions to operably engage the adjacent flange whereby the momentary loads in excess of normal torque capacities cause the spring to absorb the shock and limit the torque transmitted through the high speed gear and pinion until the driven shaft has been sufficiently accelerated.

6. A variable speed transmission as set forth in claim 5 in which the clutch means for rendering the gear trains operative comprise a self-tightening clutch connection for each gear train.

7. In a transmission:
a power shaft;
a driving shaft in alignment with the power shaft;
a coupling member for the power and driving shafts;
a driven shaft parallel to the driving shaft;
a first gear train for connecting the driving and driven shafts;
a second gear train having a different gear ratio than said first gear train for connecting the driving and driven shafts;
means for selectively rendering said gear trains operative; and,
said second gear train further comprising:
- a sleeve secured to the driven shaft;
- a collar member fixedly secured to the sleeve and having an outwardly extending flange formed on one end thereof;
- a pinion journalled on the collar flange and having an inwardly extending flange rotatably supported on the other end of the collar;
- a resilient flat-coiled spring being positioned between and engaging the collar and pinion flanges and being capable of absorbing momentary loads on the transmission which exceed the normal driving torque; and,
- a ring gear journalled on the driving shaft meshing with the pinion and operably engageable with the means rendering said second gear train operative.

8. A variable speed transmission as set forth in claim 7 in which the means for selectively rendering the gear trains operative comprise a self-tightening clutch connection for each gear train and separately operable means for initiating clutch operation.

References Cited in the file of this patent

UNITED STATES PATENTS

| | | |
|---|---|---|
| 1,146,495 | Hamel | July 13, 1915 |
| 1,431,401 | Hupp | Oct. 10, 1922 |
| 2,702,995 | Biedess | Mar. 1, 1955 |
| 2,725,758 | Dickey | Dec. 6, 1955 |